US011901612B2

(12) United States Patent
Jang et al.

(10) Patent No.: US 11,901,612 B2
(45) Date of Patent: Feb. 13, 2024

(54) ANTENNA MODULE AND ELECTRONIC DEVICE INCLUDING THE SAME

(71) Applicant: Samsung Electronics Co., Ltd., Gyeonggi-do (KR)

(72) Inventors: Jinsuk Jang, Gyeonggi-do (KR); Kyoungtae Kim, Gyeonggi-do (KR); Joonwon Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 239 days.

(21) Appl. No.: 17/549,402

(22) Filed: Dec. 13, 2021

(65) Prior Publication Data

US 2022/0209393 A1 Jun. 30, 2022

Related U.S. Application Data

(63) Continuation of application No. PCT/KR2021/018387, filed on Dec. 6, 2021.

(30) Foreign Application Priority Data

Dec. 29, 2020 (KR) ........................ 10-2020-0186002

(51) Int. Cl.
*H01Q 1/24* (2006.01)
*H01Q 1/52* (2006.01)
(Continued)

(52) U.S. Cl.
CPC ........... *H01Q 1/243* (2013.01); *H01Q 1/2283* (2013.01); *H01Q 1/48* (2013.01); *H01Q 1/526* (2013.01)

(58) Field of Classification Search
CPC ........ H01Q 1/243; H01Q 1/2283; H01Q 1/48; H01Q 1/526
See application file for complete search history.

(56) References Cited

U.S. PATENT DOCUMENTS

2013/0273858 A1 10/2013 Sover et al.
2015/0245513 A1 8/2015 Moon
(Continued)

FOREIGN PATENT DOCUMENTS

KR 2010-0128108 12/2010
KR 1020150099329 8/2015
(Continued)

OTHER PUBLICATIONS

International Search Report dated Mar. 14, 2022 issued in counterpart application No. PCT/KR2021/018387, 13 pages.

*Primary Examiner* — Graham P Smith
(74) *Attorney, Agent, or Firm* — The Farrell Law Firm, P.C.

(57) ABSTRACT

Disclosed is an antenna module including a first antenna and a second antenna, the first antenna being configured to shield a first surface of the second antenna, shield at least some of a first side of the second antenna by using a first bending part downwardly bent from a first end of the first surface, shield at least some of a second side of the second antenna by using a second bending part downwardly bent from a second end of the first surface opposite to the first end of the first surface, have a first end coupled to a housing by fastening a first fastener to a first fastening hole elongated and formed in a first direction from one end of the first bending part, and have a second end coupled to the housing by fastening a second fastener to a second fastening hole elongated and formed in a second direction from one end of the second bending part.

20 Claims, 12 Drawing Sheets

(51) Int. Cl.

| | |
|---|---|
| ***H01Q 1/22*** | (2006.01) |
| ***H01Q 1/48*** | (2006.01) |

(56) References Cited

U.S. PATENT DOCUMENTS

| | | | |
|---|---|---|---|
| 2018/0048058 | A1 | 2/2018 | Ehman et al. |
| 2019/0250734 | A1 | 8/2019 | Lee |
| 2020/0365972 | A1 | 11/2020 | Jeon et al. |

FOREIGN PATENT DOCUMENTS

| | | |
|---|---|---|
| KR | 10-2015-0115586 | 10/2015 |
| KR | 1020170010073 | 1/2017 |
| KR | 10-2018-0121850 | 11/2018 |
| KR | 10-2013234 | 8/2019 |
| KR | 1020190098889 | 8/2019 |
| KR | 1020200131731 | 11/2020 |

ANTENNA MODULE AND ELECTRONIC DEVICE INCLUDING THE SAME

PRIORITY

This application is a Bypass Continuation Application of International Application No. PCT/KR2021/018387, which was filed on Dec. 6, 2021, and is based on and claims priority under 35 U.S.C. § 119 to Korean Patent Application No. 10-2020-0186002, which was filed in the Korean Intellectual Property Office on Dec. 29, 2020, the entire disclosure of each of which is incorporated herein by reference.

BACKGROUND

1. Field

The disclosure relates generally to an electronic device, and more particularly, to an antenna module and the electronic device including the same.

2. Description of Related Art

Portable electronic devices, such as smart phones, are increasingly used, and various functions are provided to an electronic device.

The electronic device may transmit and receive telephone calls and various data to and from another electronic device through wireless communication.

The electronic device may include at least one antenna module in order to perform long distance communication (e.g., a voice call) and/or short range communication (e.g., Bluetooth™ or wireless fidelity (Wi-Fi)).

The electronic device may perform a wireless communication function corresponding to a $5^{th}$ generation (5G) communication band by using at least one antenna module.

A next-generation wireless communication technology may transmit and receive signals by using a frequency band having a range of about 3 gigahertz (GHz) to 300 GHz.

Research is being actively performed on an antenna module capable of performing 5G communication (e.g., millimeter wave (mmWave) communication), which is a type of next-generation wireless communication technology.

The antenna module for performing 5G communication needs to be reduced in size depending on various changes of an electronic device and to reduce interference with another electronic part mounted within the electronic device.

The antenna module may be disposed in a groove formed in a housing (e.g., a lateral bezel structure) of the electronic device, and may be fixed using a separate fixing member.

The antenna module may be shielded using a shielding member (e.g., a shield can) in order to reduce electromagnetic interference (EMI) with another electronic part mounted within the electronic device and/or another antenna module.

When the antenna module is fixed to the housing through the fixing member and the shielding member and performs shielding, however, a space in which other electronic parts within the electronic device are mounted tends to be limited.

Therefore, there is a need in the art for a device providing a manner in which spacing within the electronic device is not compromised by the incorporation of the antenna module.

SUMMARY

The disclosure has been made to address at least the above-mentioned problems and/or disadvantages and to provide at least the advantages described below. Accordingly, an aspect of the disclosure is to provide an electronic device in which a second antenna (e.g., mmWave (5G) module) is fixed through a conductive shielding member and the conductive shielding member may be used as a first antenna (e.g., an antenna radiator).

Another aspect of the disclosure is to provide an electronic device capable of securing a mounting space within the electronic device and operating in various frequency bands by fixing the second antenna to one side of the housing and shielding the second antenna through the conductive shielding member and using the conductive shielding member as the first antenna.

In accordance with an aspect of the disclosure, an electronic device includes a housing, a printed circuit board provided within the housing, a wireless communication module, a memory and a processor disposed in the printed circuit board, and an antenna module disposed on one side of the housing and operatively connected to the wireless communication module, wherein the antenna module comprises a first antenna and a second antenna, the first antenna being constructed to shield a first surface of the second antenna, shield at least some of a first side of the second antenna by using a first bending part downwardly bent from one end of the first surface, shield at least some of a second side of the second antenna by using a second bending part downwardly bent from another end of the first surface, have a first end coupled to the housing by fastening first fastening means to a first fastening hole elongated and formed in a first direction from one end of the first bending part, and have a second end, opposite to the first end, coupled to the housing by fastening second fastening means to a second fastening hole elongated and formed in a second direction from one end of the second bending part.

In accordance with another aspect of the disclosure, disclosed is an antenna module including a first antenna and a second antenna, the first antenna being configured to shield a first surface of the second antenna, shield at least some of a first side of the second antenna by using a first bending part downwardly bent from a first end of the first surface, shield at least some of a second side of the second antenna by using a second bending part downwardly bent from a second end of the first surface opposite to the first end of the first surface, have a first end coupled to a housing by fastening a first fastener to a first fastening hole elongated and formed in a first direction from one end of the first bending part, and have a second end coupled to the housing by fastening a second fastener to a second fastening hole elongated and formed in a second direction from one end of the second bending part.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
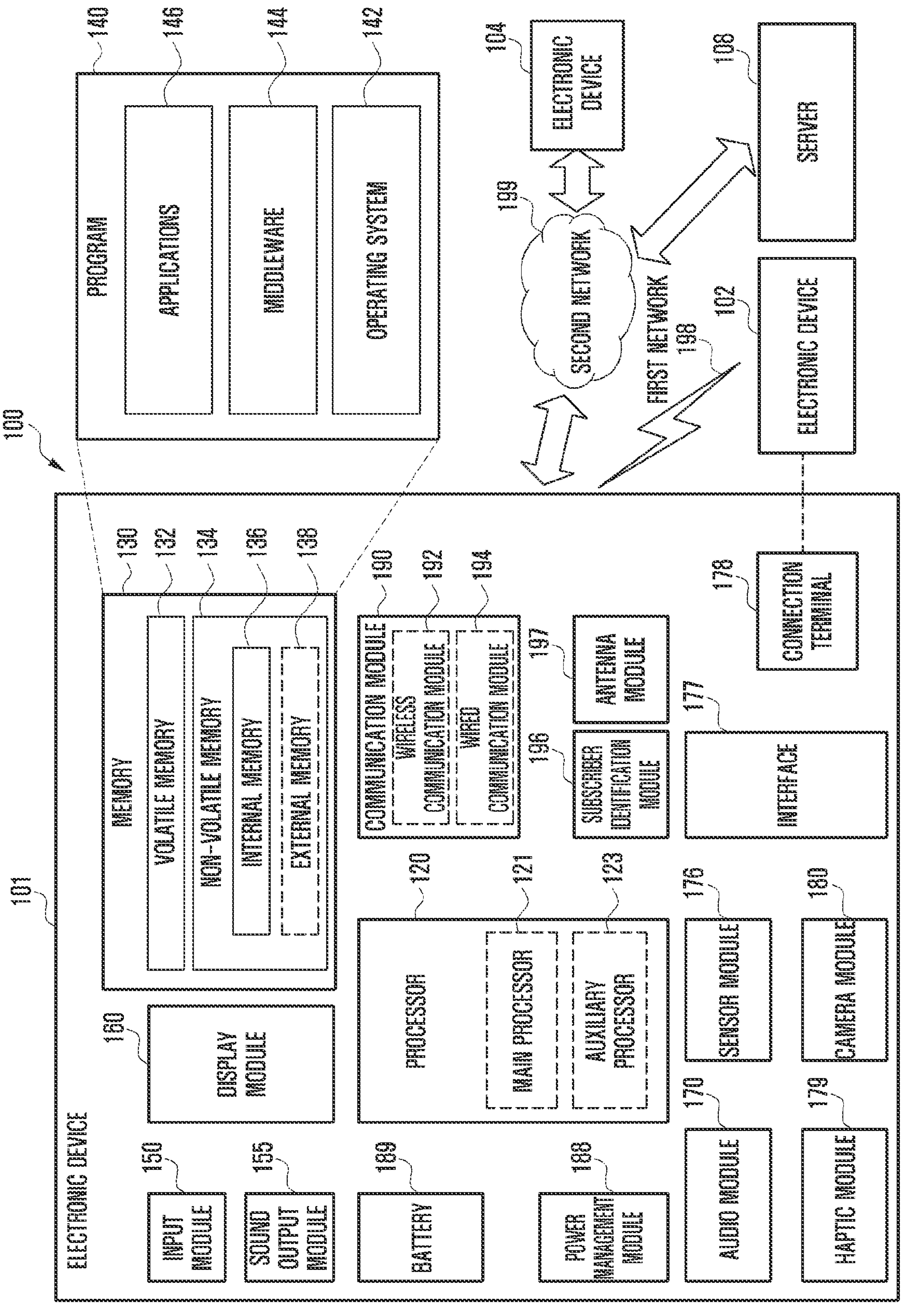
FIG. 1 illustrates an electronic device within a network environment according to an embodiment.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Figure 2:
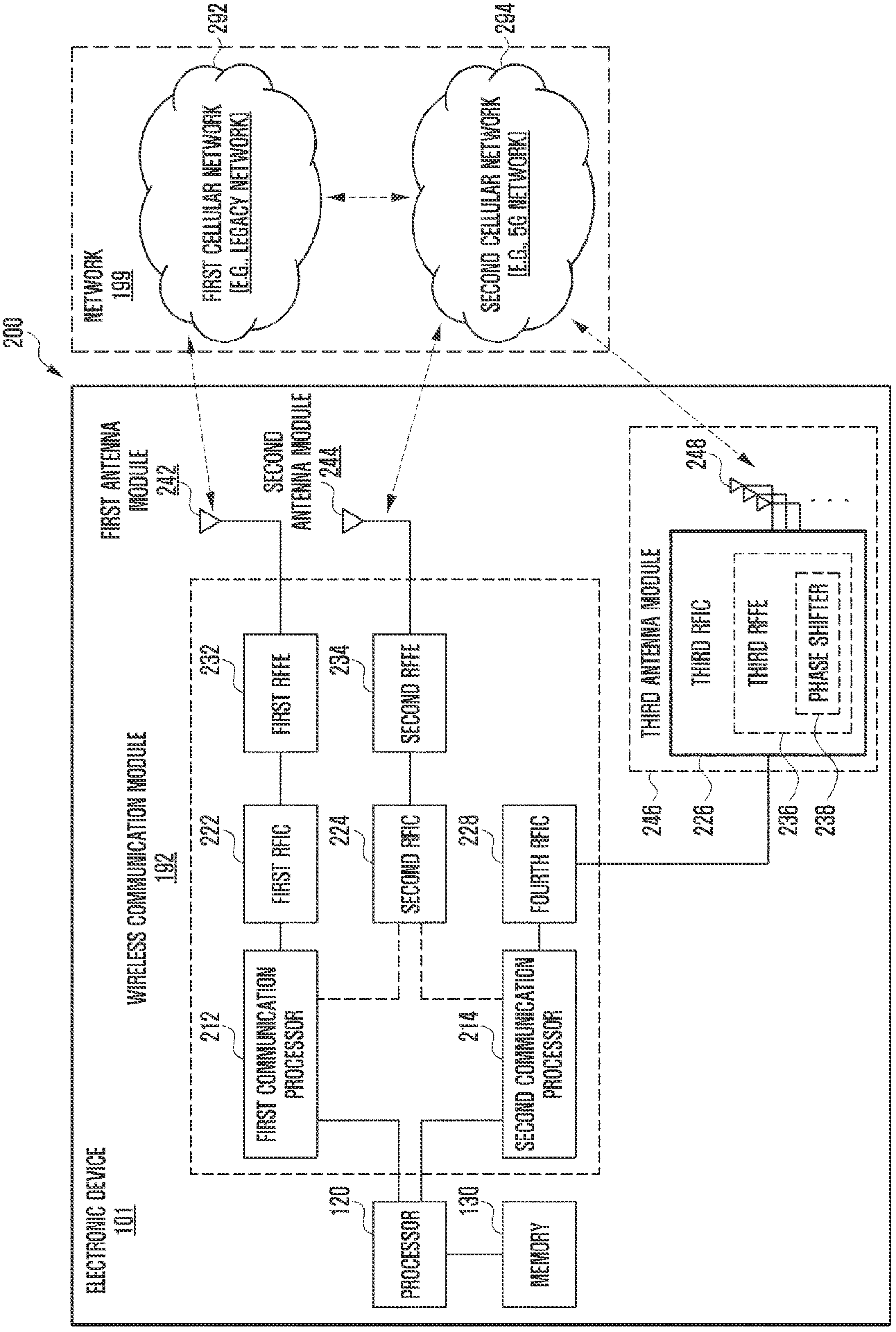
FIG. 2 illustrates an electronic device for supporting legacy network communication and 5G network communication according to an embodiment.

FIG. 2 illustrates an electronic device for supporting legacy network communication and 5G network communication according to various embodiments of the present disclosure.

Referring to FIG. 2, the electronic device 101 may include a first communication processor 212, second communication processor 214, first RFIC (radio frequency integrated circuit) 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
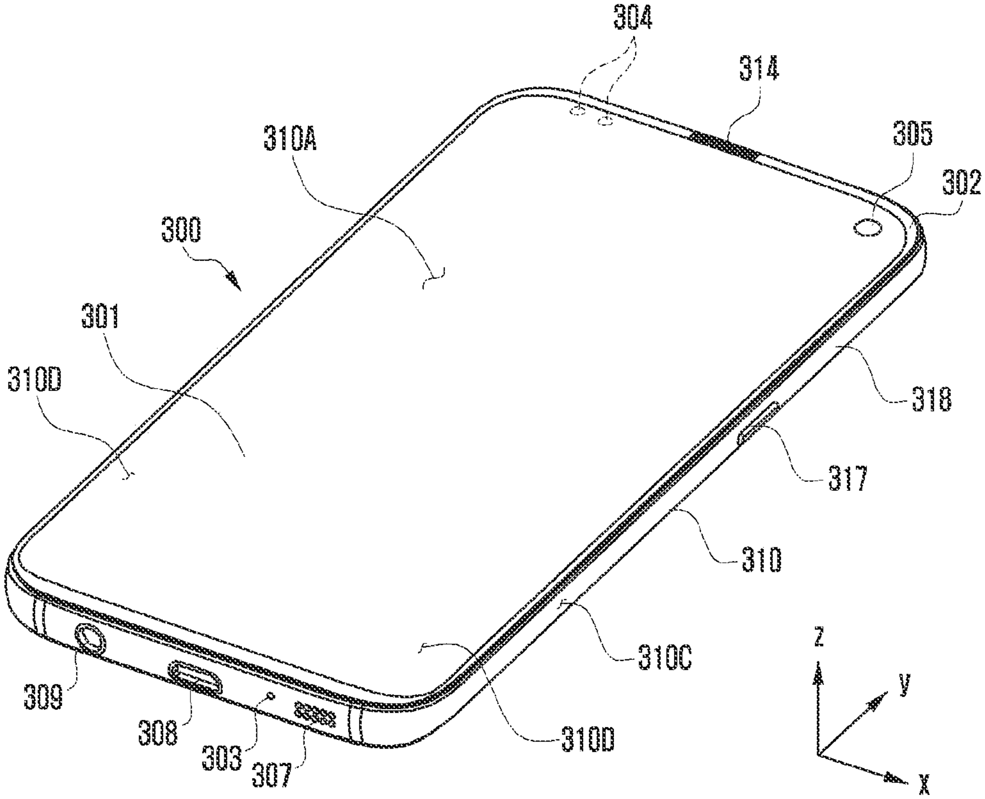
FIG. 3A illustrates the front of the electronic device according to an embodiment.
Figure 3B:
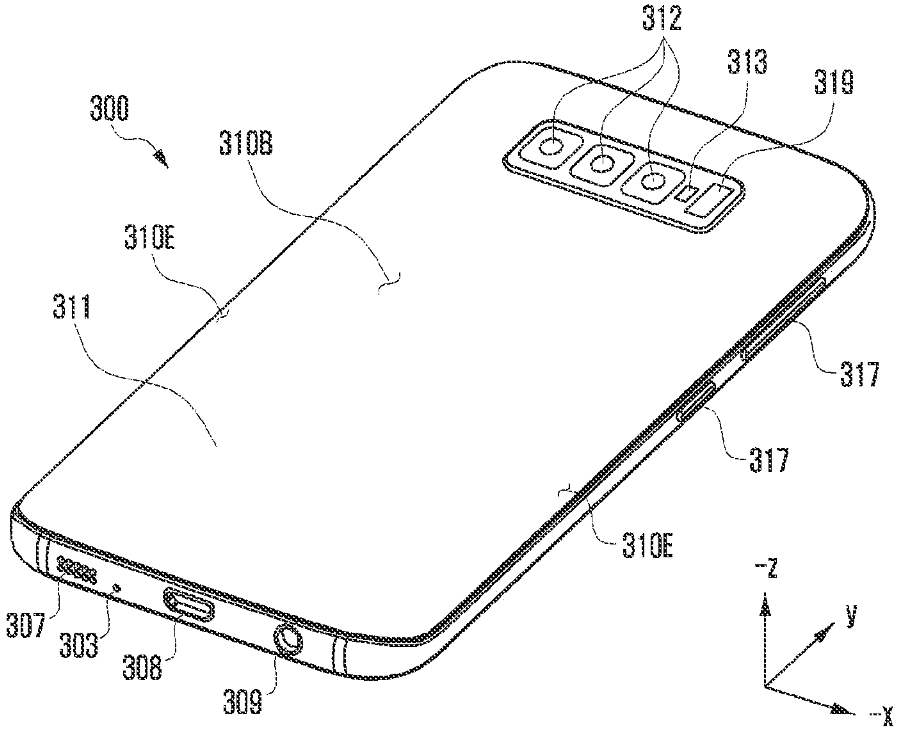
FIG. 3B illustrates the rear of the electronic device of FIG. 3A according to an embodiment.

FIG. 3A is a front perspective view illustrating a mobile electronic device 300 according to various embodiments of the disclosure. FIG. 3B is a rear perspective view illustrating a mobile electronic device 300 according to various embodiments of the disclosure.

Referring to FIGS. 3A and 3B, the electronic device 300 (e.g., the electronic device 101 of FIG. 1) according to various embodiments may include a housing 310 including a first surface (or front surface) 310A, a second surface (or rear surface) 310B, and a side surface 310C enclosing a space between the first surface 310A and the second surface 310B. In one embodiment, the housing (310) may refer to a structure forming some of the first surface 310A, the second surface 310B, and the side surface 310C. According to one embodiment, the first surface 310A may be formed by an at least partially substantially transparent front plate 302 (e.g., a polymer plate or a glass plate including various coating layers). The second surface 310B may be formed by a substantially opaque rear plate 311. The rear plate 311 may be formed by, for example, coated or colored glass, ceramic, polymer, metal (e.g., aluminum, stainless steel (STS), or magnesium), or a combination of at least two of the above materials. The side surface 310C may be coupled to the front plate 302 and the rear plate 311 and be formed by a side bezel structure (or "side member") 318 including a metal and/or a polymer. In some embodiments, the rear plate 311 and the side bezel structure 318 may be integrally formed and include the same material (e.g., metal material such as aluminum).

In the illustrated embodiment, the front plate 302 may include two first regions 310D bent and extended seamlessly from the first surface 310A toward the rear plate 311 at both ends of a long edge of the front plate 302. In the illustrated embodiment (see FIG. 3B), the rear plate 311 may include two second regions 310E bent and extended seamlessly from the second surface 310B towards the front plate 302 at both ends of a long edge. In some embodiments, the front plate 302 (or the rear plate 311) may include only one of the first regions 310D (or the second regions 310E). In one embodiment, a portion of the first regions 310D or the second regions 310E may not be included. In the above embodiments, when viewed from the side surface of the mobile electronic device 300, the side bezel structure 318 may have a first thickness (or width) at a side surface in which the first region 310D or the second region 310E is not included and have a second thickness smaller than the first thickness at a side surface including the first region 310D or the second region 310E.

According to one embodiment, the electronic device 300 may include at least one of a display 301, audio modules 307 and 314, sensor modules 304 and 319, camera modules 305, 312, and 313, key input device 317, indicator, and/or connector holes 308 and 309. In some embodiments, the electronic device 300 may omit at least one (e.g., the key input device 317 or indicator) of the components or may further include other components.

The display 301 may be exposed through, for example, a substantial portion of the front plate 302. In some embodiments, at least part of the display 301 may be exposed through the front plate 302 forming the first region 310D of the side surface 310C and the first surface 310A. In one embodiment, the display 301 may be coupled to or disposed adjacent to a touch detection circuit, a pressure sensor capable of measuring intensity (pressure) of the touch, and/or a digitizer for detecting a stylus pen of a magnetic field method. In some embodiments, at least part of the sensor modules 304 and 319 and/or at least part of the key input device 317 may be disposed in a first region 310D and/or a second region 310E.

The audio modules 303, 307, and 314 may include a microphone hole 303 and speaker holes 307 and 314. The microphone hole 303 may dispose a microphone for obtaining an external sound therein; and, in some embodiments, a plurality of microphones may be disposed to detect a direction of a sound. The speaker holes 307 and 314 may include an external speaker hole 307 and a call receiver hole 314. In some embodiments, the speaker holes 307 and 314 and the microphone hole 303 may be implemented into one hole, or the speaker may be included without the speaker holes 307 and 314 (e.g., piezo speaker).

The sensor modules 304 and 319 may generate an electrical signal or a data value corresponding to an operating state inside the electronic device 300 or an environment state outside the mobile electronic device 300. The sensor modules 304 and 319 may include, for example, a first sensor module 304 (e.g., proximity sensor) and/or a second sensor module (e.g., fingerprint sensor), disposed at the first surface 310A of the housing 310, and/or a third sensor module 319 (e.g., a heart rate monitor (HRM) sensor) and/or a fourth sensor module 316 (e.g., fingerprint sensor), disposed at the second surface 310B of the housing 310. The fingerprint sensor may be disposed at the second surface 310B as well as the first surface 310A (e.g., the display 301) of the housing 310. The electronic device 300 may further include a sensor module, for example, at least one of a gesture sensor, gyro sensor, air pressure sensor, magnetic sensor, acceleration sensor, grip sensor, color sensor, IR sensor, biometric sensor, temperature sensor, humidity sensor, and illumination sensor 304.

The camera modules 305, 312, and 313 may include a first camera device 305 disposed at the first surface 310A of the mobile electronic device 300, a second camera device 312 disposed at the second surface 310B thereof, and/or a flash 313. The camera modules 305 and 312 may include one or a plurality of lenses, an image sensor, and/or an image signal processor. The flash 313 may include, for example, a light emitting diode or a xenon lamp. In some embodiments, two or more lenses (infrared camera, wide angle and telephoto lens) and image sensors may be disposed at one surface of the electronic device 300.

The key input device 317 may be disposed at the side surface 310C of the housing 310. In one embodiment, the electronic device 300 may not include some or all of the above-described key input devices 317, and the key input device 317 that is not included may be implemented in other forms such as a soft key on the display 301. In some embodiments, the key input device 317 may include a sensor module 316 disposed at the second surface 310B of the housing 310.

The indicator may be disposed at, for example, the first surface 310A of the housing 310. The indicator may provide, for example, status information of the electronic device 300 in an optical form. In one embodiment, the indicator may provide, for example, a light source interworking with an operation of the camera module 305. The indicator may include, for example, a light emitting diode (LED), an IR LED, and a xenon lamp.

The connector holes 308 and 309 may include a first connector hole 308 that may receive a connector (e.g., a USB connector) for transmitting and receiving power and/or data to and from an external electronic device and/or a second connector hole (e.g., earphone jack) 309 that can receive a connector for transmitting and receiving audio signals to and from an external electronic device.

Figure 3C:
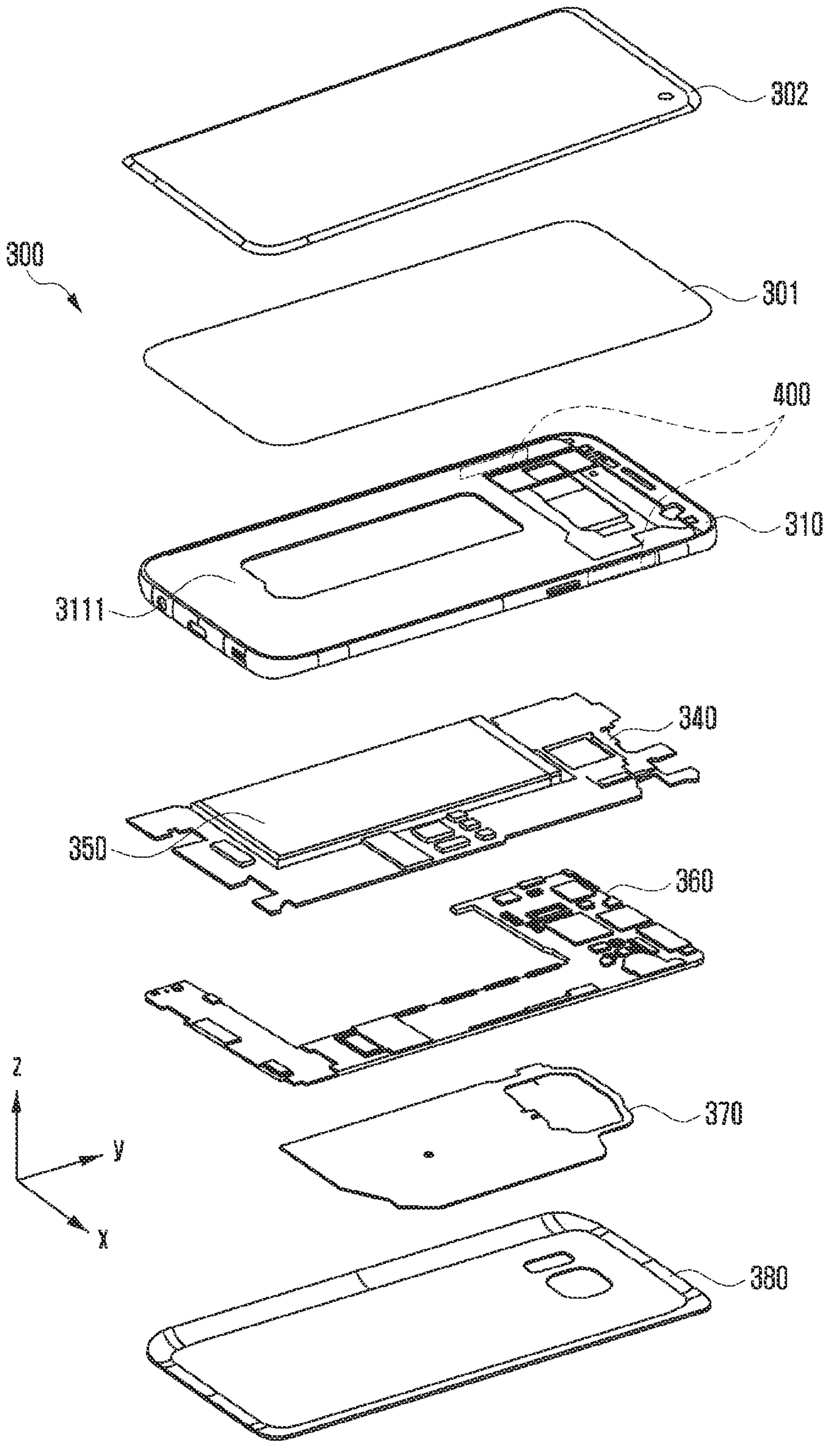
FIG. 3C illustrates an exploded view of the electronic device of FIG. 3A according to an embodiment.

FIG. 3C is an exploded perspective view illustrating the electronic device according to various embodiments of the disclosure.

Referring to FIG. 3C, the electronic device 300 (e.g., the mobile electronic device 300 of FIG. 3A) may include a side bezel structure 321, first support member 3111 (e.g., bracket), front plate 302, display 301, printed circuit board 340, battery 350, second support member 360 (e.g., rear case), antenna 370, and rear plate 380. In some embodiments, the electronic device 300 may omit at least one (e.g., the first support member 3111 or the second support member 360) of the components or may further include other components. At least one of the components of the electronic device 300 may be the same as or similar to at least one of the components of the mobile electronic device 300 of FIG. 3A or 3B and a duplicated description is omitted below.

The first support member 3111 may be arranged inside the electronic device 300 and connected to the side bezel structure 310, or may be formed integrally with the side bezel structure 310. The first support member 3111 may be made of a metal material and/or a nonmetal (for example, polymer) material, for example. The display 301 may be coupled to one surface of the first support member 3111, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 3111.

An antenna module 400 may be disposed on the side of the lateral bezel structure 310. At least one antenna module 400 may be disposed on one side and/or the other side of the lateral bezel structure 310. The antenna module 400 may be disposed between the first support member 311 and the PCB 360. The antenna module 400 may be disposed on the first support member 311. The antenna module 400 may be electrically or operatively connected to the wireless communication module 192 disposed in the PCB 360.

Figure 4A:
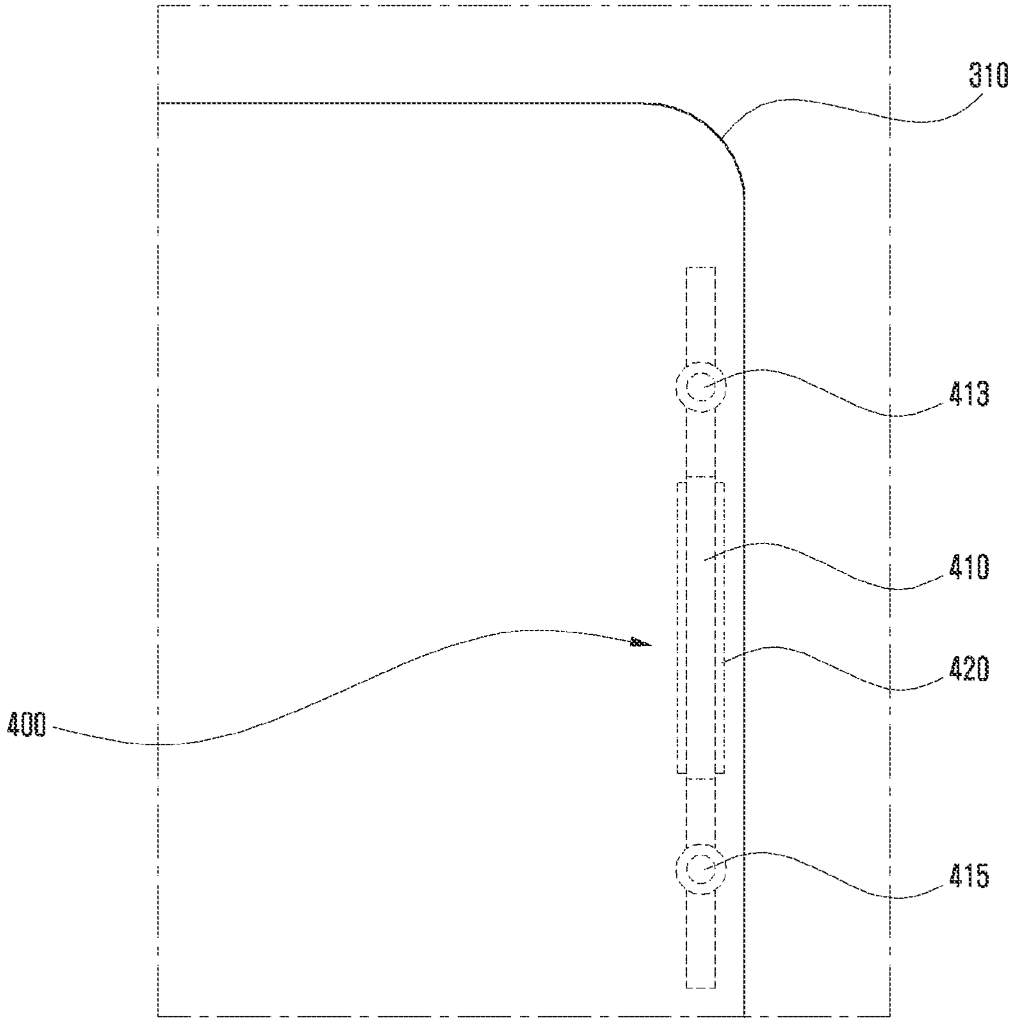
FIG. 4A illustrates a configuration in which an antenna module is disposed in a housing according to an embodiment.
Figure 4B:
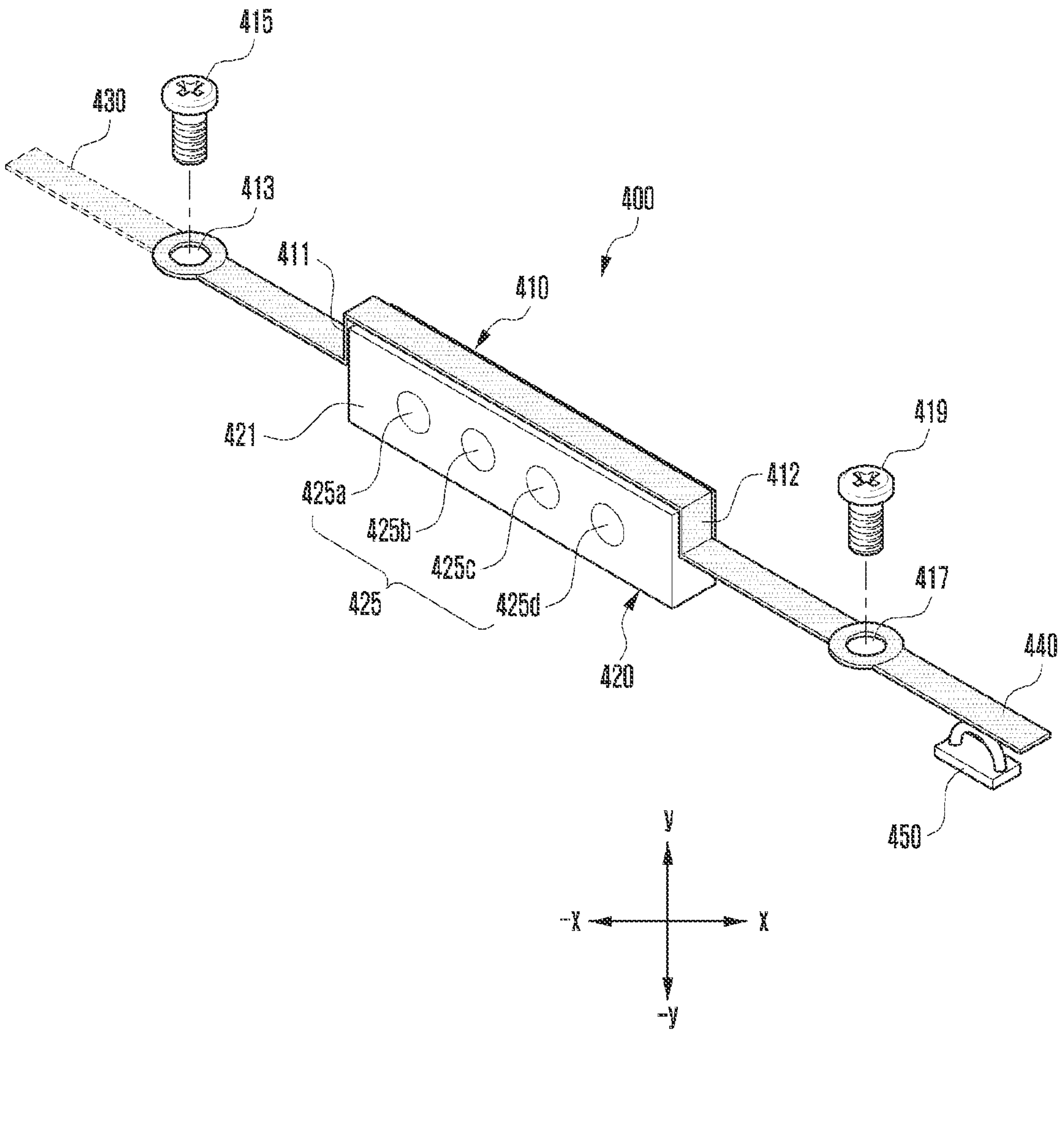
FIG. 4B illustrates a configuration of the antenna module according to a first embodiment.

FIG. 4A illustrates a configuration in which the antenna module is disposed in the housing according to an embodiment. FIG. 4B illustrates a configuration of the antenna module according to an embodiment.

The embodiments related to FIGS. 4A and 4B may include the embodiments disclosed in FIGS. 1 to 3C. For example, the antenna module 400 disclosed in FIGS. 4A and 4B may include the embodiments described through the antenna module 197 in FIG. 1 and first antenna module 242 and/or the second antenna module 244 in FIG. 2. The antenna module 400 may be electrically connected to the wireless communication module 192 in FIG. 1 or 2.

Referring to FIGS. 4A and 4B, at least one antenna module 400 may be disposed on the side of the housing 310.

The antenna module 400 may include a first antenna 410 and a second antenna 420. Each of the first antenna 410 and the second antenna 420 may be electrically connected to a feeding part and a ground part disposed in the PCB 340. The feeding part may support the first antenna 410 and/or the second antenna 420 to transmit and receive wireless signals. The ground part may ground the first antenna 410 and/or the second antenna 420.

The first antenna 410 may be a conductive shielding member that shields at least the top and/or the side of the second antenna 420. The first antenna 410 may be electrically connected to the wireless communication module 192 disposed in the PCB 340 and may construct the first antenna module 242 in FIG. 2. The first antenna 410 may shield at least some of the second antenna 420 and also operate in a first frequency band of about 2 GHz to 6 GHz.

The first antenna 410 may include a first bending part 411, a second bending part 412, a first fastening hole 413 and/or a second fastening hole 417.

The first antenna 410 may shield a first surface (e.g., the top) of the second antenna 420 having a rectangular shape, for example. The first bending part 411 may be downwardly (e.g., a −y axis direction) bent from one end of the first surface and may shield at least some of a first side (e.g., the left side) of the second antenna 420. The second bending part 412 may be downwardly bent from the other end of the first surface and may shield at least some of a second side (e.g., the right side) of the second antenna 420.

The first fastening hole 413 may be formed in a portion elongated in a first direction (e.g., a −x axis direction) from one end of the first bending part 411. First fastening means 415 (e.g., a screw or a bolt) may be coupled to the first fastening hole 413. One end of the first antenna 410 may be coupled to the housing 310 through the first fastening means

415. The first fastening means 415 may be made of a conductive material and may be electrically connected to the PCB 340.

The first elongation part 430 elongated in the first direction (e.g., the −x axis direction) may be integrated and connected to the first fastening hole 413. The length of the first elongation part 430 may be adjusted in accordance with a resonant frequency of the first antenna 410. The first elongation part 430 may adjust the resonance of the first antenna 410.

The second fastening hole 417 may be formed in a portion elongated in a second direction (e.g., an x axis direction) from one end of the second bending part 412. Second fastening means 419 (e.g., a screw or a bolt) may be coupled to the second fastening hole 417. The other end of the first antenna 410 may be coupled to the housing 310 through the second fastening means 419. The second fastening means 419 may be made of a conductive material and may be electrically connected to the PCB 340.

A second elongation part 440 elongated in the second direction (e.g., the x axis direction) may be integrated and connected to the second fastening hole 417. The second elongation part 440 may be electrically connected to a first conductive connection member 450 that may include a C-clip. The first conductive connection member 450 may be disposed in the PCB 360. The first antenna 410 may be electrically connected to the feeding part or the ground part disposed in the PCB 340 through the first conductive connection member 450.

The first antenna 410 may shield and fix the second antenna 420. Some portions of the first antenna 410 may be coupled to the housing 310 through the first fastening hole 413 and the first fastening means 415, and other portions of the first antenna 410 may be coupled to the housing 310 through the second fastening hole 417 and the second fastening means 419.

At least some of a first surface (e.g., the top), a first side (e.g., the left side) and a second side (e.g., the right side) of the second antenna 420 may be shielded using the first antenna 410. The second antenna 420 may be electrically connected to the wireless communication module 192 disposed in the PCB 340 and may construct the second antenna module 244 in FIG. 2. The second antenna 420 may operate in a second frequency band of about 20 GHz to 100 GHz. The second antenna 420 may have a rectangular shape, for example. The second antenna 420 may have various shapes, such as a structure illustrated in FIG. 9.

The first surface (e.g., the top) of the second antenna 420 may be shielded using the first antenna 410. At least some of the first side (e.g., the left side) of the second antenna 420 may be shielded by the first bending part 411 of the first antenna 410. At least some of the second side (e.g., the right side) of the second antenna 420 may be shielded by the second bending part 412 of the first antenna 410. The second antenna 420 may be disposed between the first fastening hole 413 and the second fastening hole 417.

The second antenna 420 may include a dielectric 421 and an antenna array 425.

The dielectric 421 may include a plurality of conductive layers and a plurality of non-conductive layers alternately stacked along with the conductive layers. The dielectric 421 may be electrically connected to various electronic parts disposed outside the second antenna 420 by using lines and conductive vias formed in the conductive layers.

The dielectric 421 may be a base member. The dielectric 421 may include a board. The dielectric 421 may include a flexible PCB (FPCB). The dielectric 421 may be made of a material having a low dielectric constant and dielectric loss (e.g., modified polyimide (MPI) or liquid crystal polymer (LCP)).

The antenna array 425 may include a plurality of antenna elements 425*a*, 425*b*, 425*c* and/or 425*d* (e.g., conductive patches) disposed to form a directional beam. The antenna elements 425*a*, 425*b*, 425*c* and/or 425*d* may be formed on one surface (e.g., the top or the side) of the dielectric 421. Alternatively, the antenna array 425 may be formed within the dielectric 421.

The antenna array 425 may include a plurality of antenna arrays (e.g., dipole antenna arrays and/or patch antenna arrays) having the same shape or different shapes and/or different types. The antenna array 425 may be electrically connected to the PCB 360 through a module interface. The module interface may include a connection member, such as a coaxial cable connector, a board-to-board connector, an interposer, or an FPCB. The antenna array 425 may be grounded by being electrically connected to at least some of the housing 310. The antenna array 425 may be grounded through a ground layer disposed on the other surface of the dielectric 421.

Figure 5:
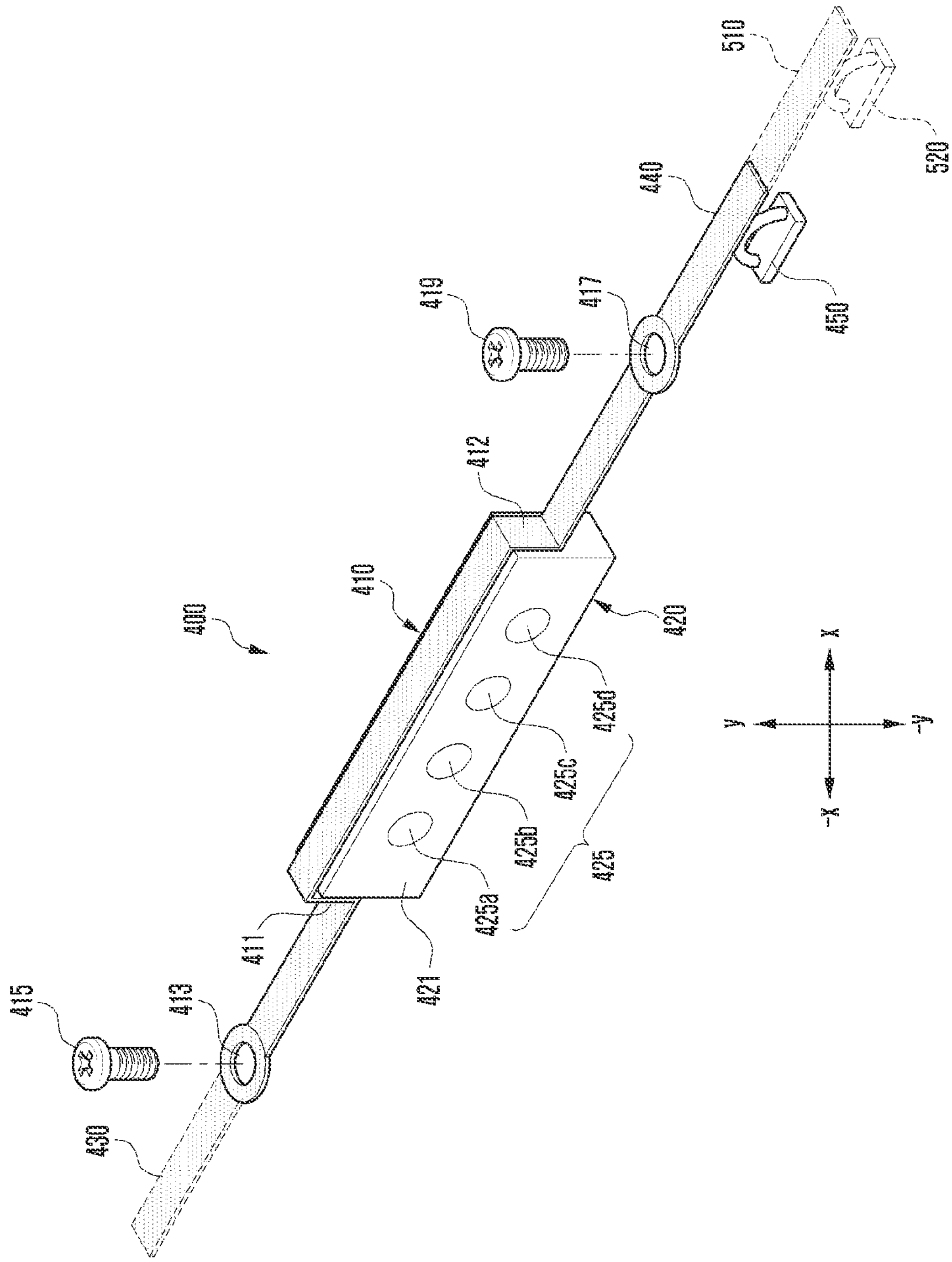
FIG. 5 illustrates a configuration of the antenna module according to a second embodiment.
Figure 6:
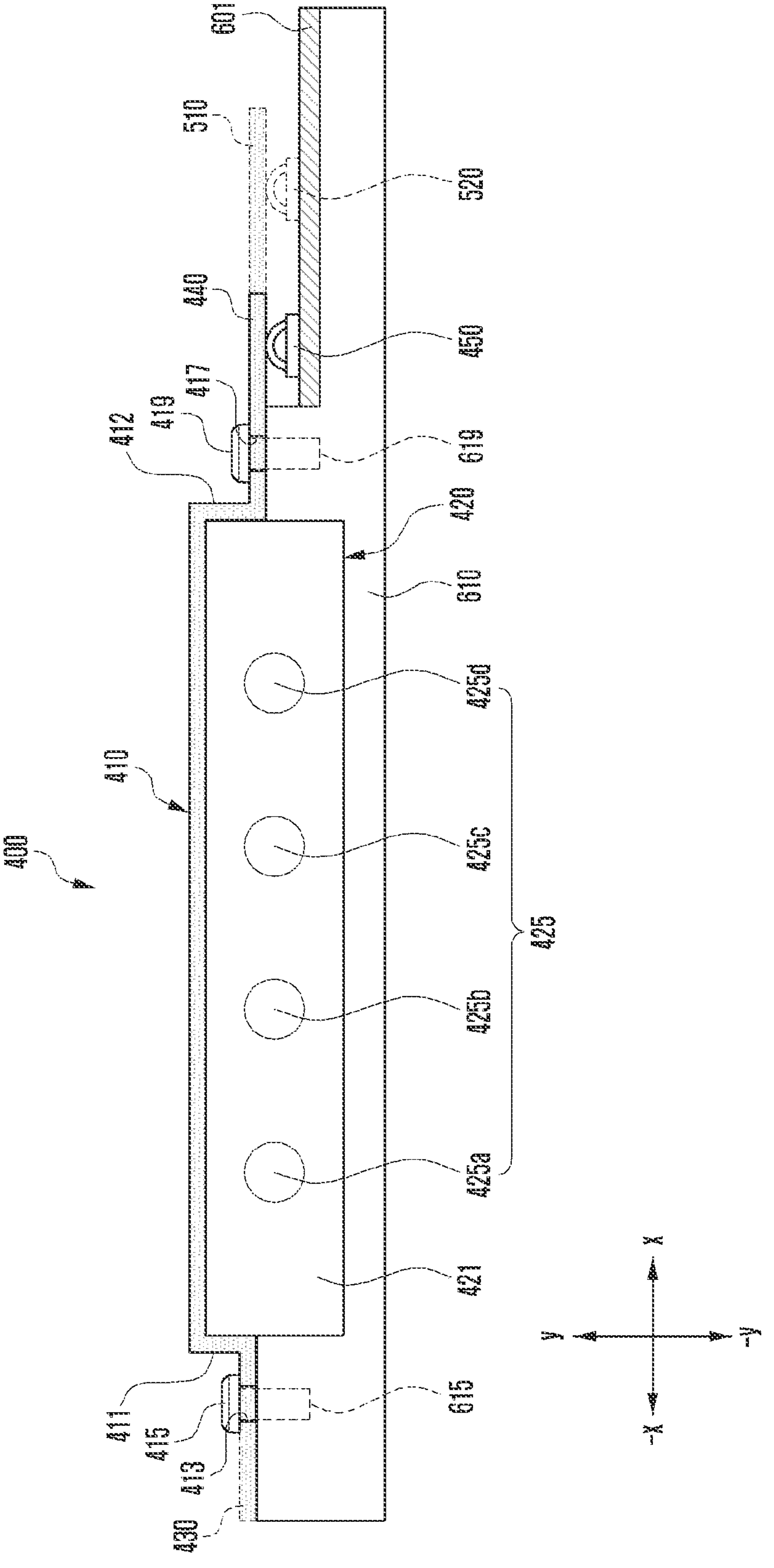
FIG. 6 is a cross-sectional view schematically illustrating a configuration in which the antenna module is disposed in the housing according to an embodiment.

FIG. 5 illustrates a configuration of an antenna module according to a second embodiment. FIG. 6 is a cross-sectional view schematically illustrating a configuration in which the antenna module is disposed in the housing according to an embodiment.

The embodiments related to FIGS. 5 and 6 may include the embodiments disclosed in FIGS. 1 to 4B. In the description of FIGS. 5 and 6, a redundant description of the same configuration and function as those in the embodiments of FIGS. 1 to 4B may be omitted.

Referring to FIGS. 5 and 6, an antenna module 400 may include a first antenna 410 and a second antenna 420. The first antenna 410 may further include a third elongation part 510 and a second conductive connection member 520.

The first antenna 410 may be embodied using a conductive shielding member that shields at least some of the second antenna 420. The first antenna 410 may operate in a frequency band having a range of about 2 GHz to 6 GHz, for example.

The second antenna 420 may be coupled to a housing 610 by using the first antenna 420. The second antenna 420 may operate in a frequency band having a range of about 20 GHz to 100 GHz, for example.

The first antenna 410 may shield a first surface (e.g., the top) of the second antenna 420. The first antenna 410 may shield at least some of a first side (e.g., the left side) of the second antenna 420 by using a first bending part 411 downwardly (e.g., a −y axis direction) bent from one end of the first surface. The first antenna 410 may shield at least some of a second side (e.g., the right side) of the second antenna 420 by using a second bending part 412 downwardly (e.g., the −y axis direction) bent from the other end of the first surface.

The first antenna 410 may be coupled to the housing 610 by fastening first fastening means 415 to a first fastening groove 615 formed in the housing 610 through a first fastening hole 413 formed in a portion elongated in a first direction (e.g., a −x axis direction) from one end of the first bending part 411. The first fastening means 415 may be electrically connected to a PCB 601 by using an FPCB, and may play a feeding and/or ground role.

The resonance of the first antenna 410 may be adjusted using a first elongation part 430 integrated and elongated from the first fastening hole 413 in the first direction (e.g., the −x axis direction).

The first antenna 410 may be coupled to the housing 610 by fastening the second fastening means 419 to a second fastening groove 619 formed in the housing 610 through a second fastening hole 417 formed in a portion elongated in a second direction (e.g., the x axis direction) from one end of the second bending part 412. The second fastening means 419 may be electrically connected to the PCB 601 by using a first conductive connection member 450. Alternatively, the second fastening means 419 may be electrically connected to the PCB 601 by using an FPCB, and may play a feeding and/or ground role. The second fastening hole 417 may be electrically connected to a conductive pad in which a surrounding metal material is formed in the PCB 601.

A second elongation part 440 of the first antenna 410 integrated and elongated from the second fastening hole 417 in the second direction (e.g., the x axis direction) may be connected to the first conductive connection member 450. The first conductive connection member 450 may be electrically connected to a feeding part disposed in the PCB 601, for example.

The first antenna 410 of the antenna module 400 may further include the third elongation part 510 and the second conductive connection member 520.

The third elongation part 510 may be elongated from the second elongation part 440 in the second direction (e.g., the x axis direction), and may be integrated and connected to the second elongation part 440. The third elongation part 510 may be electrically connected to the second conductive connection member 520, which may include a C-clip. The first antenna 410 may be electrically connected and grounded to a ground part disposed in the PCB 601 through the second conductive connection member 520. The length of the third elongation part 510 may be adjusted in accordance with a resonant frequency of the first antenna 410. The first elongation part 510 may adjust the resonance of the first antenna 410.

Figure 7:
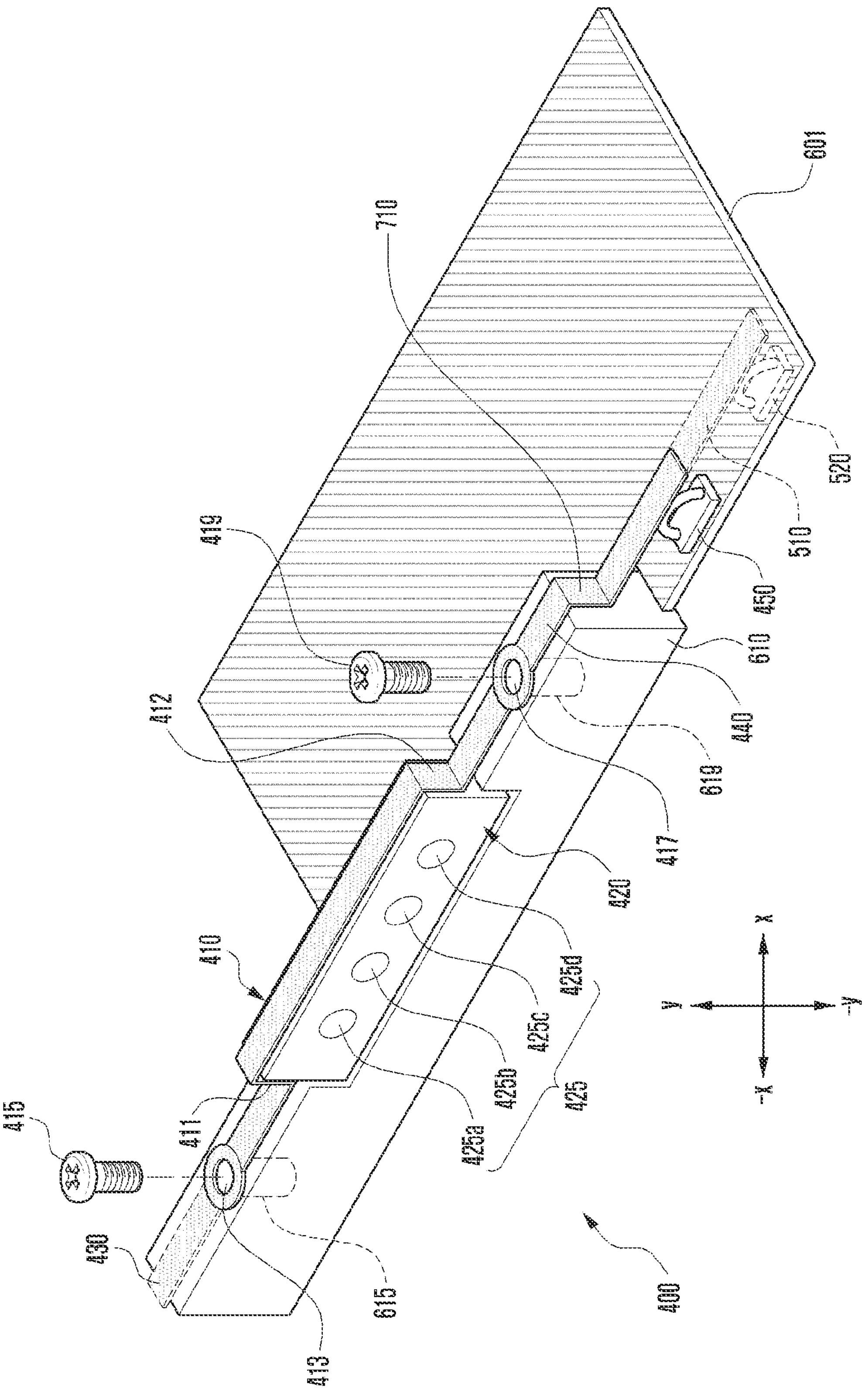
FIG. 7 is a perspective view schematically illustrating a configuration in which the antenna module is disposed in the housing according to an embodiment.

FIG. 7 is a perspective view schematically illustrating a configuration in which the antenna module is disposed in the housing according to an embodiment.

The embodiment related to FIG. 7 may include the embodiments disclosed in FIGS. 1 to 6. In the description of FIG. 7, a redundant description of the same configuration and function as those in the embodiments of FIGS. 4A to 6 may be omitted.

Referring to FIG. 7, the first antenna 410 of the antenna module 400 may further include a third bending part 710.

The third bending part 710 may be bent in various shapes depending on a shape of the housing 610. The third bending part 710 may be composed of the second elongation part 440 integrated and elongated from the second fastening hole 417 in the second direction (e.g., the x axis direction).

The housing 610 may have one end perpendicularly constructed. The second elongation part 440 may be downwardly (e.g., the −y axis direction) bent along a perpendicular surface of the housing 610, and may construct the third bending part 710.

Figure 8:
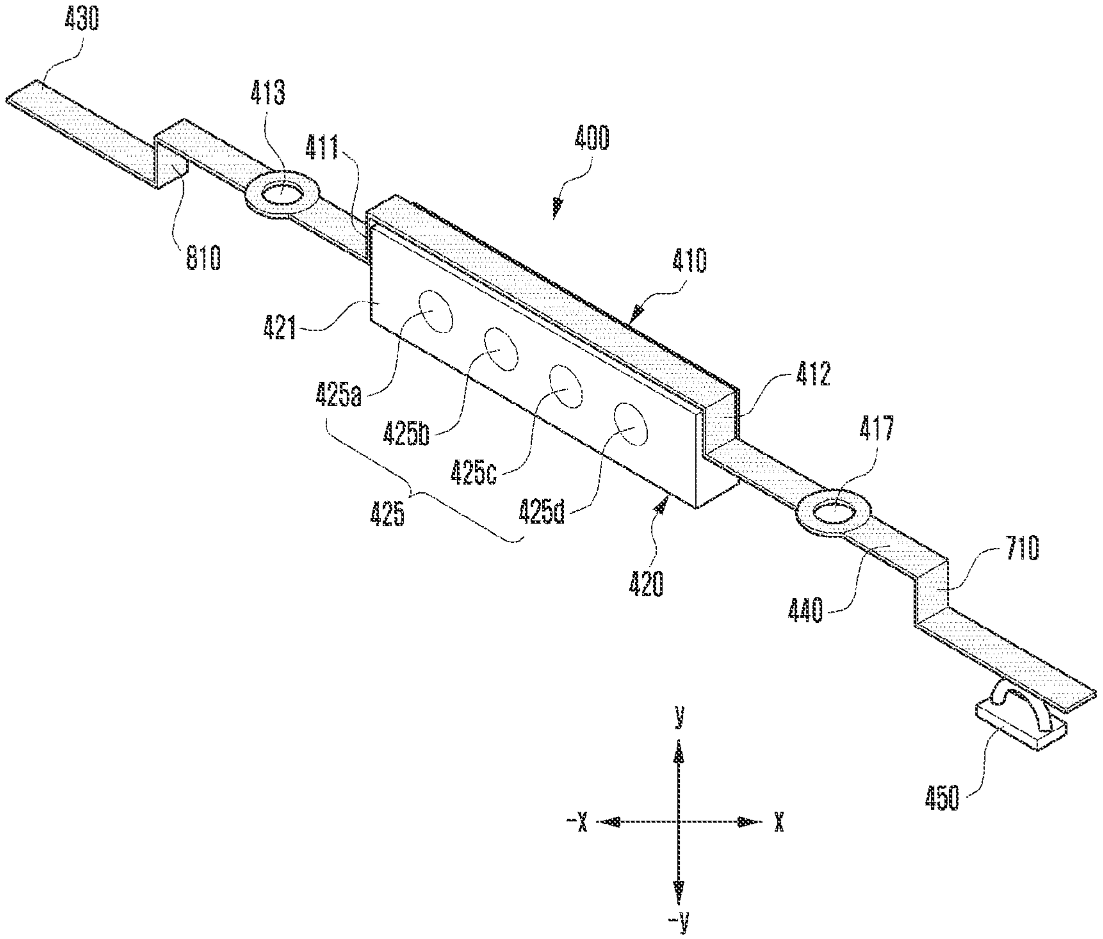
FIG. 8 illustrates a configuration of the antenna module according to a third embodiment.

FIG. 8 illustrates a configuration of an antenna module according to a third embodiment.

The embodiment related to FIG. 8 may include the embodiments disclosed in FIGS. 1 to 7. In the description of FIG. 8, a redundant description of the same construction and function as those in the embodiments of FIGS. 4A to 7 may be omitted.

Referring to FIG. 8, the first antenna 410 of the antenna module 400 may further include a fourth bending part 810.

The fourth bending part 810 may be bent in various shapes depending on a shape of the housing 610. The fourth bending part 810 may be composed of the first elongation part 430 integrated and elongated from the first fastening hole 413 in the first direction (e.g., the −x axis direction).

If the housing 610 has one end perpendicularly constructed, the first elongation part 430 may be downwardly (e.g., the −y axis direction) bent along a perpendicular surface of the housing 610 and may construct the fourth bending part 810.

The antenna module 400 can secure a space for mounting other electronic parts by fixing and shielding the second antenna 420 (e.g., a mmWave (5G) module) to one side of the housing through the first antenna 410 (e.g., the conductive shielding member).

Figure 9:
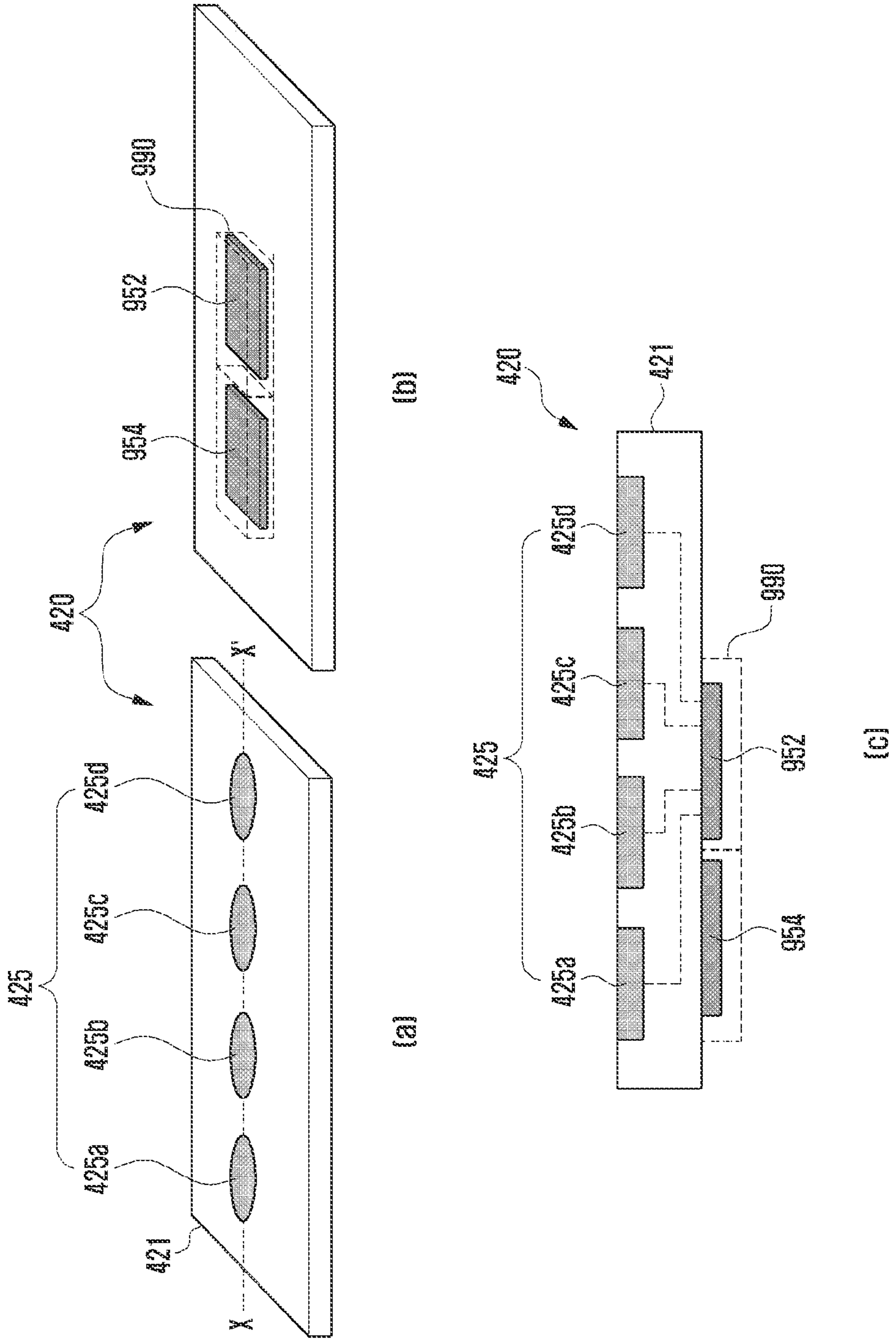
FIG. 9 illustrates a structure of a second antenna described with reference to FIGS. 4A to 8.

FIG. 9 illustrates a structure of the second antenna described with reference to FIGS. 4A to 8.

FIG. 9 illustrates the second antenna 420, which is viewed from one side. FIG. 9 illustrates the second antenna 420, which is viewed from another side. FIG. 9 is a cross-sectional view of X-X' of the second antenna 420.

Referring to sections (a) and (b) of FIG. 9, the second antenna 420 may include the dielectric 421 (e.g., a PCB), the antenna array 425, a radio frequency integrated circuit (RFIC) 952, a power management integrated circuit (PMIC) 954, and a shielding member 990. At least one of the described parts may be omitted, or at least two of the parts may be integrated and formed.

The dielectric 421 (e.g., the PCB) may include a plurality of conductive layers and a plurality of non-conductive layers alternately stacked along with the conductive layers. The dielectric 421 may provide an electronic connection between the dielectric 421 and/or various electronic parts disposed in the outside by using lines and conductive vias formed in the conductive layers.

The antenna array 425 may include the plurality of antenna elements 425*a*, 425*b*, 425*c*, or 425*d* disposed to form a directional beam. The antenna elements, as illustrated, may be formed in a first surface of the dielectric 421. Alternatively, the antenna array 425 may be formed within the dielectric 421. The antenna array 425 may include a plurality of antenna arrays (e.g., dipole antenna arrays and/or patch antenna arrays) having the same or different shapes or types.

The RFIC 952 may be disposed in another area (e.g., a second surface opposite to the first surface) of the dielectric 421, which is isolated from the antenna array 425. The RFIC 952 may be embodied to process signals having a selected frequency band, which are transmitted and received through the antenna array 425. Upon transmission, the RFIC 952 may convert, into an RF signal having a designated band, a baseband signal obtained from a communication processor. Upon reception, the RFIC 952 may convert, into a baseband signal, an RF signal received through the antenna array 425, and may transmit the baseband signal to the communication processor.

Alternatively, upon transmission, the RFIC 952 may up-convert, into an RF signal having a selected band, an IF signal of about 9 GHz to about 11 GHz obtained from an intermediate frequency integrate circuit (IFIC). Upon reception, the RFIC 952 may down-convert, into an IF signal, an RF signal obtained through the antenna array 425, and may transmit the IF signal to the IFIC.

The PMIC 954 may be disposed in another area (e.g., the second surface) of the dielectric 421, which is isolated from the antenna array 425. The PMIC 954 may be supplied with a voltage from a main PCB PCB601, and may provide required power to the RFIC 952 on the antenna module.

The shielding member 990 may be disposed in the second surface of the dielectric 421 so as to electromagnetically shield at least one of the RFIC 952 or the PMIC 954. The shielding member 990 may include a shielding can.

The second antenna 420 may be electrically connected to another PCB through a module interface. The module interface may include a connection member, for example, a coaxial cable connector, a board-to-board connector, an interposer, or an FPCB. The RFIC 952 and/or the PMIC 954 may be electrically connected to the PCB through the connection member.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:

a housing;

a printed circuit board provided within the housing;

a wireless communication module, a memory and a processor disposed in the printed circuit board; and an antenna module disposed on one side of the housing and operatively connected to the wireless communication module, wherein the antenna module comprises a first antenna and a second antenna, the first antenna being configured to:

shield a first surface of the second antenna, shield at least some of a first side of the second antenna by using a first bending part downwardly bent from one end of the first surface, shield at least some of a second side of the second antenna by using a second bending part downwardly bent from another end of the first surface, have a first end coupled to the housing by fastening first fastening means to a first fastening hole elongated and formed in a first direction from one end of the first bending part, and have a second end, opposite to the first end, coupled to the housing by fastening second fastening means to a second fastening hole elongated and formed in a second direction from one end of the second bending part.

2. The electronic device of claim 1, wherein the first antenna is a conductive shielding member.

3. The electronic device of claim 1, wherein the first antenna is configured to operate in a frequency band having a range of 2 gigahertz (GHz) to 6 GHz.

4. The electronic device of claim 1, wherein the second antenna is configured to operate in a frequency band having a range of 20 GHz to 100 GHz.

5. The electronic device of claim 1, further comprising a first elongation part, wherein the first elongation part is elongated in the first direction and is integrated and connected to the first fastening hole.

6. The electronic device of claim 5, further comprising a second elongation part, wherein the second elongation part is elongated in the second direction and is integrated and connected to the second fastening hole.

7. The electronic device of claim 6, wherein the second elongation part is electrically connected to a first conductive connection member disposed in the printed circuit board.

8. The electronic device of claim 7, further comprising a third elongation part integrated and elongated in the second direction from the second elongation part.

9. The electronic device of claim 8, wherein the third elongation part is electrically connected to a second conductive connection member disposed in the printed circuit board.

10. The electronic device of claim 6, wherein the first elongation part further comprises a fourth bending part bent depending on a shape of the housing, and wherein the second elongation part further comprises a third bending part bent depending on a shape of the housing.

11. An antenna module comprising a first antenna and a second antenna, the first antenna being configured to:

shield a first surface of the second antenna, shield at least some of a first side of the second antenna by using a first bending part downwardly bent from a first end of the first surface, shield at least some of a second side of the second antenna by using a second bending part downwardly bent from a second end of the first surface opposite to the first end of the first surface, have a first end coupled to a housing by fastening a first fastener to a first fastening hole elongated and formed in a first direction from one end of the first bending part, and have a second end coupled to the housing by fastening a second fastener to a second fastening hole elongated and formed in a second direction from one end of the second bending part.

12. The antenna module of claim 11, wherein the first antenna is a conductive shielding member.

13. The antenna module of claim 11, wherein the first antenna is configured to operate in a frequency band having a range of 2 gigahertz (GHz) to 6 (GHz).

14. The antenna module of claim 11, wherein the second antenna is configured to operate in a frequency band having a range of 20 GHz to 100 GHz.

15. The antenna module of claim 11, further comprising a first elongation part, wherein the first elongation part is elongated in the first direction and is integrated and connected to the first fastening hole.

16. The antenna module of claim 15, further comprising a second elongation part, wherein the second elongation part is elongated in the second direction and is integrated and connected to the second fastening hole.

17. The antenna module of claim 16, wherein the second elongation part is electrically connected to a first conductive connection member disposed in the printed circuit board.

18. The antenna module of claim 17, further comprising a third elongation part integrated and elongated in the second direction from the second elongation part.

19. The antenna module of claim 18, wherein the third elongation part is electrically connected to a second conductive connection member disposed in the printed circuit board.

20. The antenna module of claim 16, wherein the first elongation part further comprises a fourth bending part bent depending on a shape of the housing, and wherein the second elongation part further comprises a third bending part bent depending on a shape of the housing.

* * * * *